(12) United States Patent
Im (10) Patent No.: US 8,500,070 B2
(45) Date of Patent: Aug. 6, 2013

(54) PERSONAL SPACECRAFT

(76) Inventor: Sunstar Im, Lancaster, CA (US)

( * ) Notice: Subject to any disclaimer, the term of this patent is extended or adjusted under 35 U.S.C. 154(b) by 216 days.

(21) Appl. No.: 12/456,008

(22) Filed: Jun. 10, 2009

(65) Prior Publication Data

US 2010/0314498 A1    Dec. 16, 2010

(51) Int. Cl.
*B64G 1/14* (2006.01)

(52) U.S. Cl.
USPC .................... 244/159.3; 244/158.9

(58) Field of Classification Search
USPC ...... D12/324, 335, 319, 331, 332; 244/159.3, 244/158.9, 158.1, 159.1, 4 R, 45 R, 45 A, 244/171.1, 171.3, 171.4, 55, 13, 15, 46–49
See application file for complete search history.

(56) References Cited

U.S. PATENT DOCUMENTS

| | | | |
|---|---|---|---|
| D199,105 S * | 9/1964 | Sleeman | D12/335 |
| 5,415,365 A * | 5/1995 | Ratliff | 244/101 |
| 5,427,329 A * | 6/1995 | Renzelmann et al. | 244/49 |
| 5,526,999 A * | 6/1996 | Meston | 244/2 |
| 7,669,802 B2 * | 3/2010 | Dorman | 244/158.1 |
| 7,690,601 B2 * | 4/2010 | Janeke | 244/158.9 |
| 2005/0178911 A1 * | 8/2005 | Armand | 244/119 |

* cited by examiner

*Primary Examiner* — Tien Dinh
*Assistant Examiner* — Keith L Dixon

(57) ABSTRACT

The present invention relates to a spacecraft structure that comprises a flat-wide body center fuselage, right and left side arch-wings and rocket propulsion power plant compartments, wherein the arch-wing is anchored to the fuselage via a foldable hinge mechanism. The fuselage structure is constructed as a single solid structure body of the spacecraft. A top portion at the rear of fuselage comprises a jet propulsion power plant to provide thrust during take-off from the airport. Both the left and right side arch-wings are anchored to a front and a rear portion of the center fuselage structure. Both the front and rear wing portions enable spacecraft lift and superior maneuverability during flight. The spacecraft is air tight and water tight and includes floatation devices.

10 Claims, 9 Drawing Sheets

PERSONAL SPACECRAFT

BACKGROUND OF THE INVENTION

The present invention relates to a foldable Arch-Wings spacecraft structure comprises multi-fuselage, multi-arch wings, multi-main rocket propulsion and multi re-action engine propulsion compartments structure.

This invention relates to a spacecrafts structure comprises flat-wide body center fuselage, both right and left side of arch wings/rocket propulsion power plant compartments fuselage anchor to both side front and lower portion of the rear center fuselage structure which could foldable by hinge mechanism.

Spacecrafts comprises three fuselage structure integrated with right and left side arch wings and both side rocket propulsion compartment fuselage structure as single solid structure body of spacecrafts.

Both side front and rear wings provide lifting force and super maneuverable capacity also both side stabilizer anchor at rear end fuselage structure which control axis of spacecrafts.

Front of center fuselage cockpit and passenger compartment also disposed jet power plant at rear top of fuselage structure.

Both side of arch wing/rocket propulsion compartment comprises solid and expandable rocket propulsion power systems with multi-nozzle.

Specially at home base personal spacecrafts are hard to operate in twenty first century. There is needs to be an advanced transportation spacecraft systems which that is quick, easy and economic for traveling from home to the space travel.

The present invention of foldable Arch-Wings spacecraft is the best solution for future space travel from home base.

The spacecraft could travel into space and fly back to the airport then bring it home the same way and park it at own home garage with fold or unfold wings position.

Specially the foldable both side multi-arch wings anchor to front and rear portion of the center fuselage structure.

The foldable Arch-Wings to anchor at the center fuselage body structure with such kinds of spacecrafts, it is the evolution of the new Arch-Wings technology in twenty first century which would contribute to the future aircraft industries bright and versatility wings developments the Arch-wings are created new breed of spacecrafts wings technologies widely open for the next century air transportation field.

Most critical operation of the space travel required "FOUR STAGE OPERATION" in critical point of technology in my present invention of concepts.

FIST STAGE OPERATION; jet propulsion power from earth base to high altitude around one hundred thousand foot or more until take over by main rocket propulsion power to continue proceed toward space which used to heavier and high cost solid booster rocket propulsion power.

SECOND STAGE OPERATION; rocket propulsion power take over at around one hundred thousand foots from jet propulsion power to continue proceed to escape earth-gravitation escape velocity about eighteen thousands miles per an hour speed to space THIRD STAGE OPERATION; multi re-action propulsion engine power vertical take off and land (VTOL) moon base station and which need enough fuel to fly back.

FOURTH STAGE OPERATION; most dangerous and critical time operating sequence are breath taking off !

Which present invention expose of technology.

When start gravitation free fall to try make it slow down the spacecrafts with main rocket propulsion power braking, multi re-action engine propulsion power braking and finally jet propulsion power braking at close to re-entry atmosphere with multi-maneuver and multi direction of spacecrafts and various propulsion power to take control need. Also jet propulsion power driving to slow mode as like rock and hill driving behavior further it takes time to up and down slow phase to landing home base which prevent high thermal problems of the spacecrafts.

That is why employed to booster power with main rocket propulsion, multi re-action propulsion and finally jet propulsion power does braking job accomplish.

Prior arts included U.S. patents;

| | | | | |
|---|---|---|---|---|
| 3,065,937 | 3,160,366 | 3,204,892 | 3,534,924 | D396685 |
| 4,047,680 | 4,165,058 | 4,735,381 | 4,836,479 | 5,125,206 |
| 5,415,365 | 6,666,406B2 | 7,195,207B2 | 7,287,722 | |

To accomplish many objectives which were not possible, it is necessary to break the center fuselage, both side Arch wing/rocket propulsion compartment fuselage, jet propulsion power, rocket propulsion power and multi re-action propulsion power accordingly, which need for the spacecraft structure.

This invention is directed to solve these problems and satisfy the long felt need.

SUMMARY OF THE INVENTION

The present invention contrives to solve the disadvantages of the prior arts, another objective of the invention is to provide the spacecraft structure which includes flat wide body fuselage structure which comprises cockpit and passenger cabin. Still another object of the invention is to provide the spacecraft structure which includes a fuselage having first level, top surface and bottom surface.

Still another object of the invention is to provide the spacecraft structure, which includes fuel tank storage and a plurality of the compartment with wall insulation for prevent thermal high heat condition.

Still another object of the invention provide the spacecraft structure which includes a foldable Arch-Wings structure anchor both side front and rear portion of the lower fuselage structure body by the hinge and latch-lock, unlock mechanism which both side arch wings upward and downward operate by pneumatic systems.

Also both side multi-winglets disposed at both side rear fuselage structure.

Both right and left side each arch wings anchor both side center fuselage lower structure by foldable wings Hinge mechanism.

Whole structure of spacecrafts multi-geometric form of carbon wire integrated into between ceramic fiber layer of top and bottom with fire proof glue and coating surface of structure by ceramic compound.

Both right and left side foldable arch wings disposed horizontally in right and left side of center fuselage structure which are configured to provide lifting force and super maneuverable to control flight of the spacecraft.

Right and left side of rocket propulsion power compartment comprises multi-rocket propulsion compartments and multi-nozzle systems which provide propulsion power for the space travel capacity.

The first level comprises cockpit, various navigation compartments, a plurality of passenger cabins, jet fuel tank compartments and pneumatic systems.

The top portion of the rear fuselage comprises jet power plant to provide air propulsion power to take off from the airport to the high altitude atmosphere until take over by rocket propulsion thrust power and fly back to land at airport.

The passenger cabin may further comprises a plurality of seating system, passenger cabin door, front window and side windows.

The spacecraft structure may further comprises each of the two front arch wings and the two rear arch wings may comprises an each elevator, each of the two front arch wings and two rear arch wings have a cross-sectional shape of lamina flow, each of two front arch wings and two rear arch wings may comprises a plurality multi-geometric form of carbon wire Integrated into between ceramic fiber layer of composite molded wings with fire proof glue and ceramic compound coating on surface of structure.

The plurality of landing gear bays maybe aligned in two parallel lines in the right side and left side landing gear bays at both front portion and rear portion landing gear bays. Each of the two front arch wings and the two rear arch wings comprises one or more elevators which provide super maneuverable arch wings structure.

Each of the two vertical winglets may comprises a stabilizer of spacecrafts. Another aspect of the invention provide the spacecraft structure for the spacecraft comprising the fuselage having a cross-section of the substantially a flat fuselage shape in a direction of width, the fuselage being wide enough to provide lifting force wherein the fuselage comprises, first level, an upper top surface, and a lower surface, Specially foldable Arch-Wings comprises, It is designed like arch shape of each wings as solid one wing structure body could fold or unfold both wings which could parking at home garage as sports spacecraft. Also jet power, rocket thrust propulsion power and re-action engine power systems comprises combination multi-power propulsion plants provide multi-roll operation are need to achieve the critical mission.

The foldable both side arch wings to anchor both side at the center fuselage body structure by the hinge and latch-lock, unlock mechanism is to provide two or more of right and left side pneumatic actuator with cylinder having piston pin to lock or unlock position into locking hole position and need to operate actuator pins pressurized or released pressure by the pilots choice when it necessary.

The advantages of the present invention are;
1, The spacecraft structure can provide more lifting force with the flat fuselage than cylinder barrel shape of fuselage.
2, The foldable both side multi-arch wings structure can provide maximum lifting force and highly maneuverable, versatility and maximum flight control of the spacecrafts.
3, First stage operation; jet propulsion power.
4, Second stages operation; main rocket propulsion power.
5, Third stages operation; multi re-action propulsion power.
6; Fourth stages operation; jet power break, main rocket power brake, multi re-action engine power brake.
7, The foldable multi-arch-wings are much advantages to transportable one place to another place by trailer at road travel, just like potable spacecraft in twenty first century.
8, Jet power plants provide easy to lift off from the airport to the high speed travel into space and multi re-action propulsion to provide vertical take off and land on moon base.

Although the present invention is briefly summarized, the fuller understanding of the invention can be obtained by the following drawings, detailed description and appended claims.

BRIEF DESCRIPTION OF THE DRAWINGS

These other features, aspects and advantages of the present invention will become better understood with reference to the accompanying drawings wherein.

DETAILED DESCRIPTION EMBODIMENTS OF THE INVENTION

FIGS. 1-8, shows the spacecraft 100, according to embodiments of the present invention.

FIGS. 9-12, shows inner structure of the spacecraft 100.

Figures 7, 8:
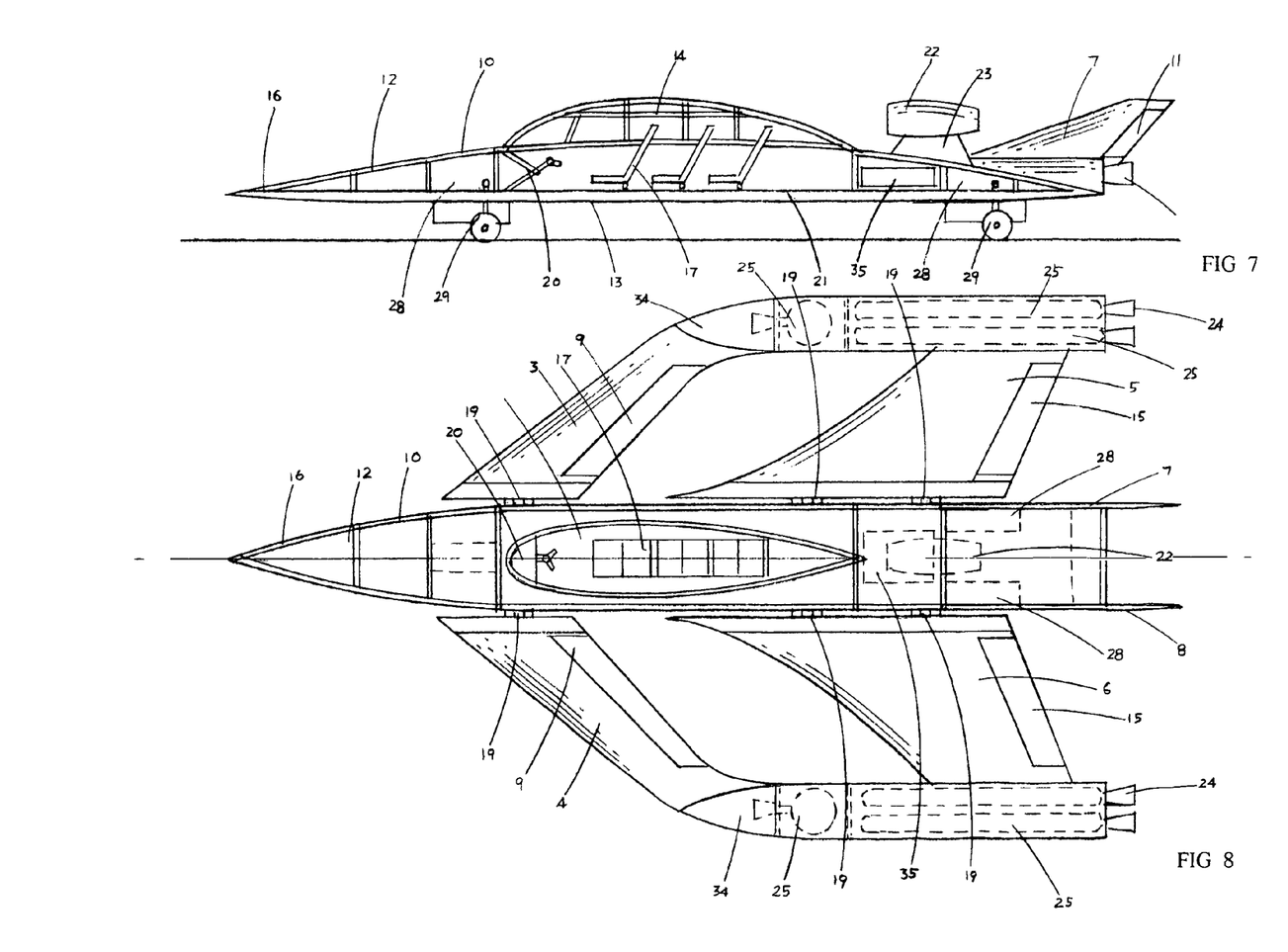
FIG. 7 is a cross section side view of the spacecraft of FIG. 1.
FIG. 8 is a cross section top view of the spacecraft of FIG. 1.
Figure 9:
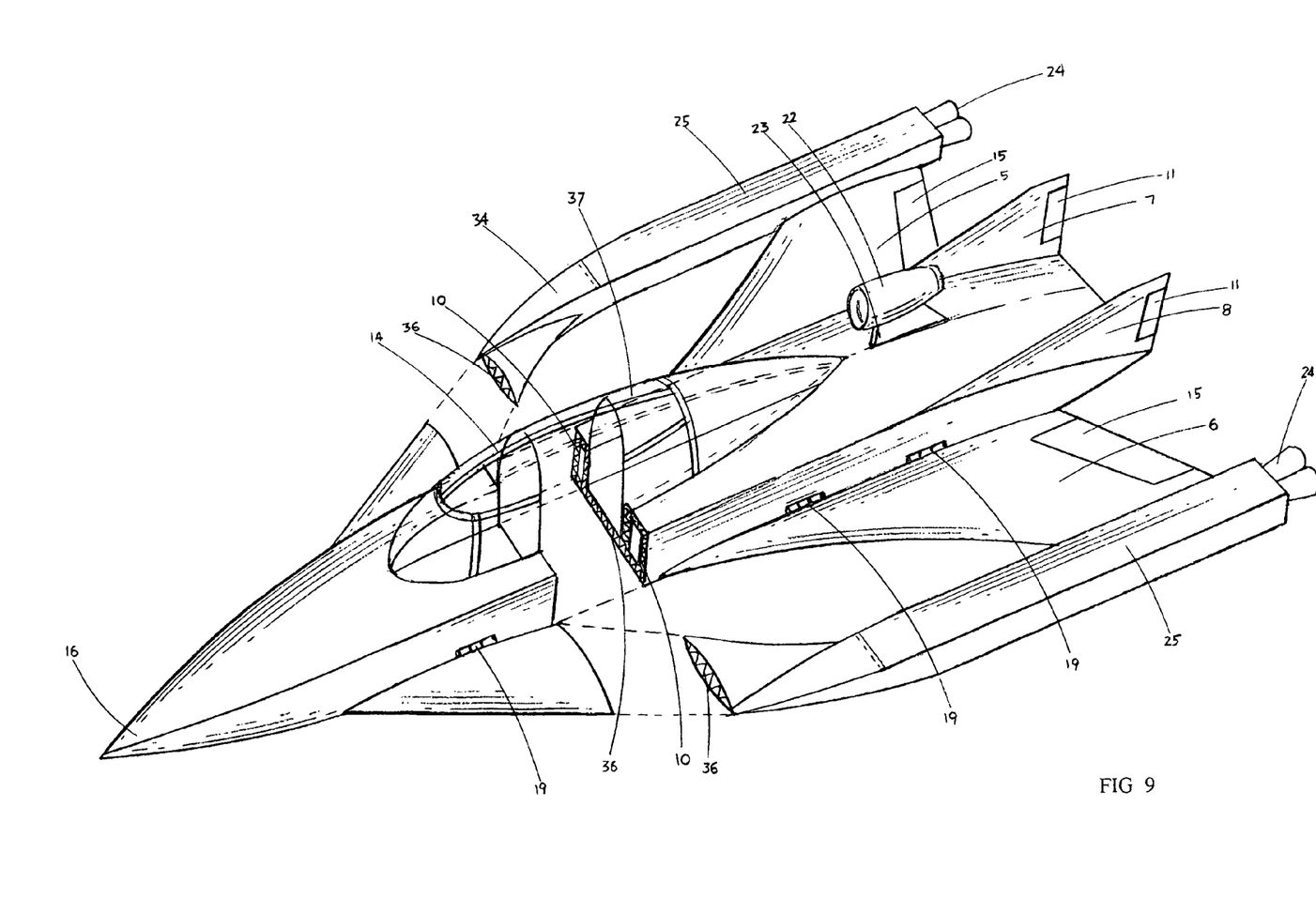
FIG. 9 is a perspective top and partial cross-section view of the spacecraft embodiment of the invention of FIG. 1.

An aspect of the invention provides the illustrated structure of the spacecraft 100, comprises a fuselage 10, the spacecraft 100, may further comprises right and left side arch-Wings of the fuselage 1, 2, may further comprises both side two front wings 3, 4, two rear wings 5, 6, and both side the vertical winglets 7,8, the spacecraft structure for the spacecraft 100, may comprises, first level 21, top surface 37, bottom surface 13, as shown in FIG. 7, 9.

The center fuselage 10, has a cross section of substantially flat fuselage shape in a direction of width, and the fuselage 10, is wide enough to provide lifting force, both side right and left side rocket propulsion compartment 25, provide main rocket propulsion power plant and re-action engine power plant and both side two front and rear wings 3,4,5,6, of the arch wings 1, 2, are disposed horizontally in front portion of the fuselage 10, and are configured to control flight of the spacecraft 100, the vertical winglets are disposed at the top of the rear fuselage 32, which control of the stabilize of the spacecrafts. And the first level 21, is configured to anchor the arch wings 1, 2, by the hinged-latch mechanism 19. provide locking, unlocking 33, 44,45, 47, systems is provide two or more of right and left side pneumatic actuator 45, mounted on bracket 48, and pneumatic actuator with cylinder 44, having piston pin 45, lock or unlock position into lock-hole plate 47, and need to operate actuator pins 45, pressurized or released pressure by the pilots choose when it necessary, as shown in FIG. 10, 11, 12, which hinged arch wings fold and unfold operation when need it.

Figure 1:
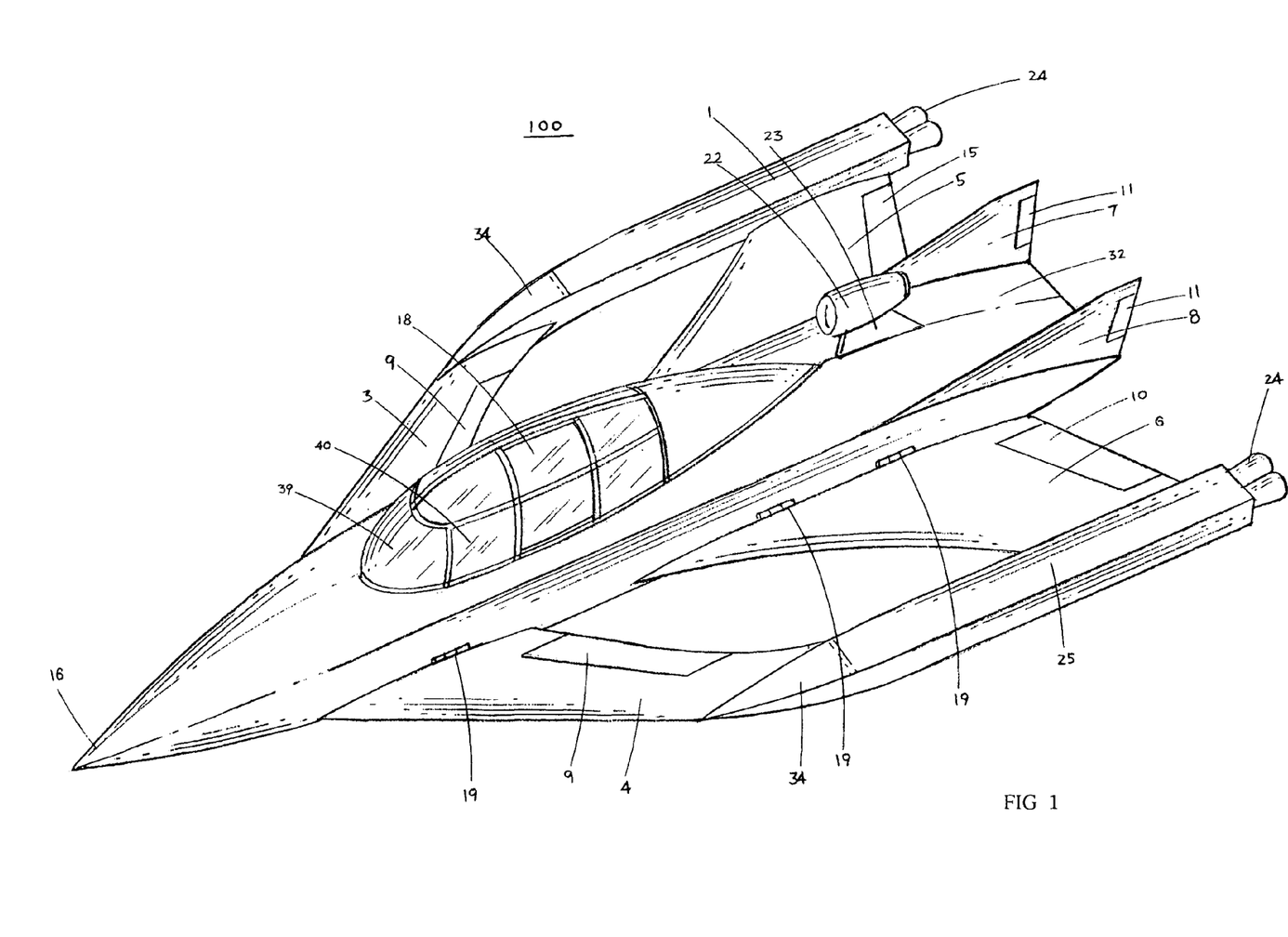
FIG. 1, is a perspective view showing the spacecraft having a structure according to an embodiment of the present invention.
Figure 5:
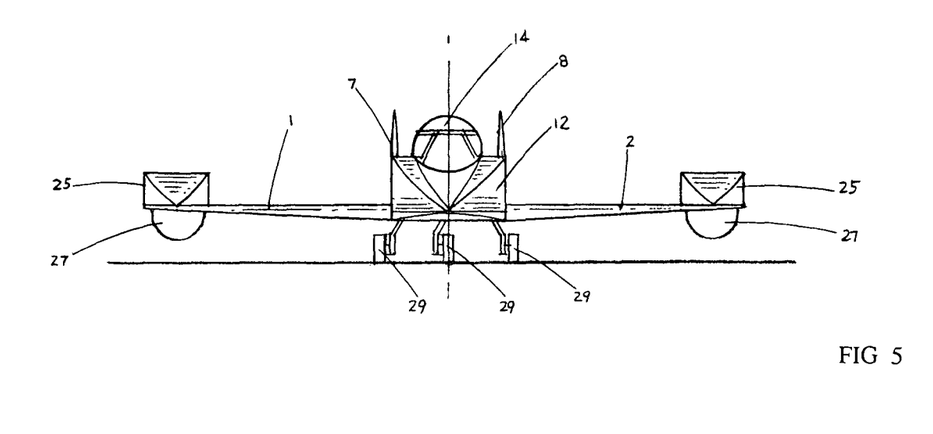
FIG. 5 is a front plan view of the spacecraft of FIG. 1.
Figure 6:
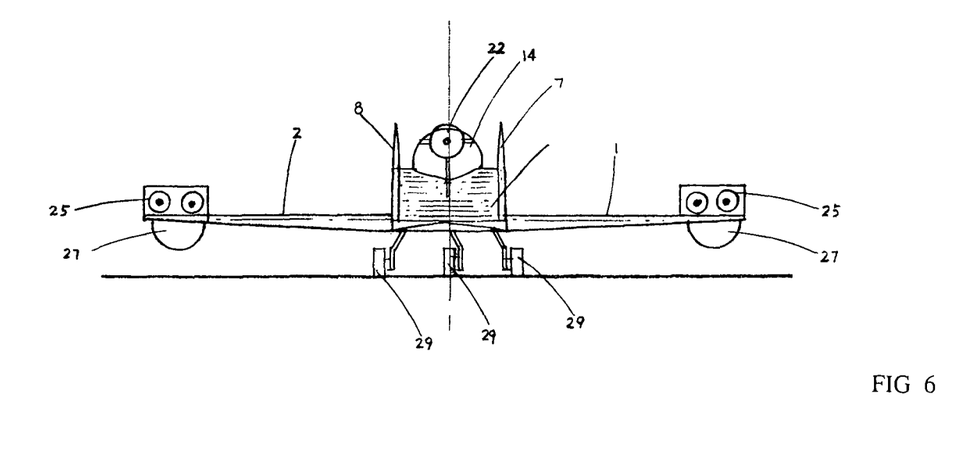
FIG. 6 is a rear plan view of the spacecraft of FIG. 1.
Figure 10:
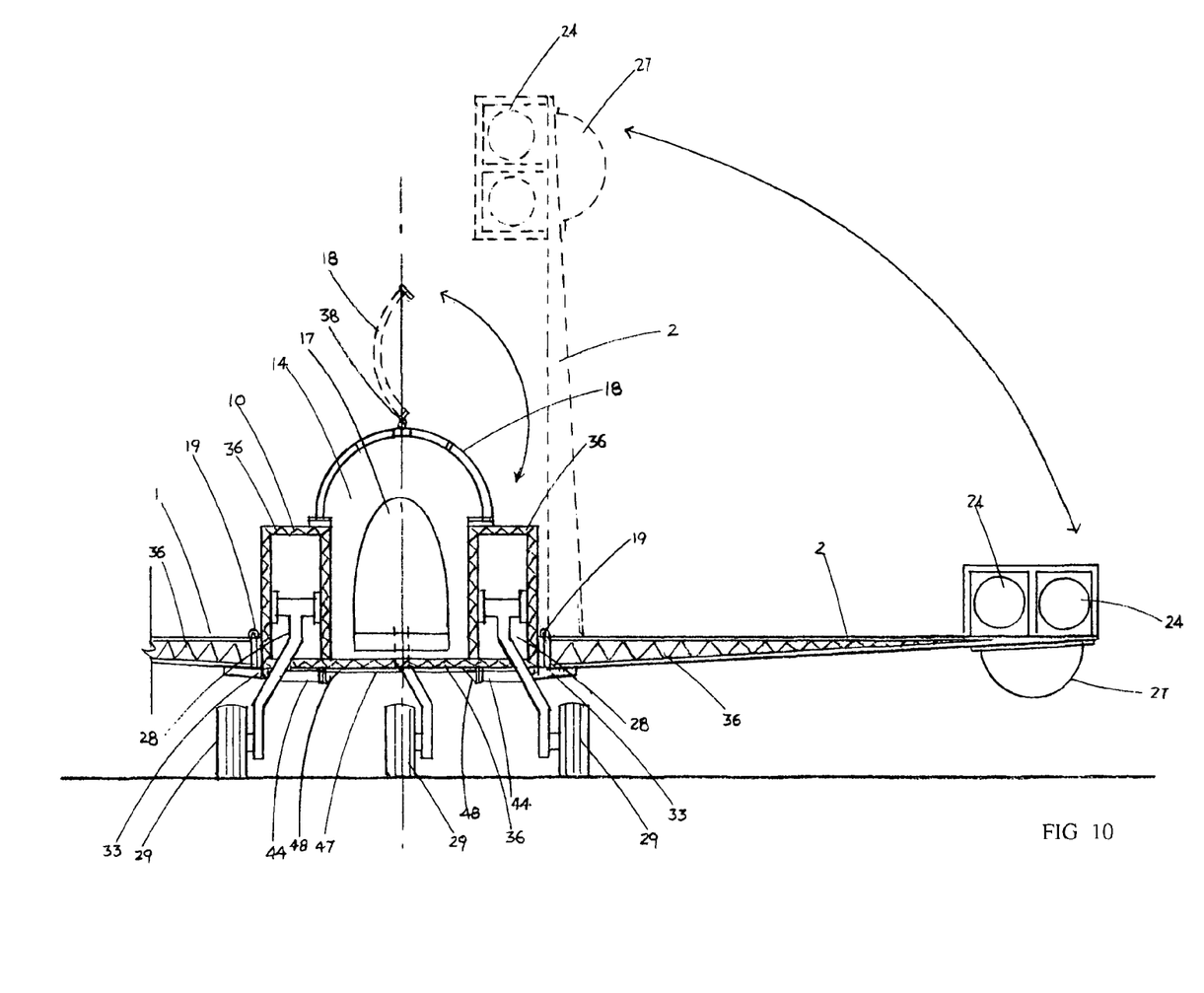
FIG. 10 is a cross section front view of the spacecraft of FIG. 9.

The center fuselage 10, may float in water and operate at sea port which structure comprise geometric form of carbon wire integrated into between top and lower ceramic fabric layer 36, with fir proof glue and coated with ceramic compound on skin of whole structure 10, which lighter weight stronger element material as shown in FIG. 9, 10. since such a structure is water tight as well as airtight, the spacecraft may be landing sea port which comprises pontoon 27, system at the belly of the rocket power compartment structure as shown in FIG. 5, 6, 10, First level cabin 14. further comprises a plurality of seating systems 17, front window 39, side windows 40, as shown in FIG. 1, 7, 8, 9, 10.

The cockpit 14, at the first level further comprises a plurality of doors 18, at cabin 14, and control panel board 20, with various necessary navigation and control systems, as shown in FIG. 1, 7, 8, 9.

Figure 2:
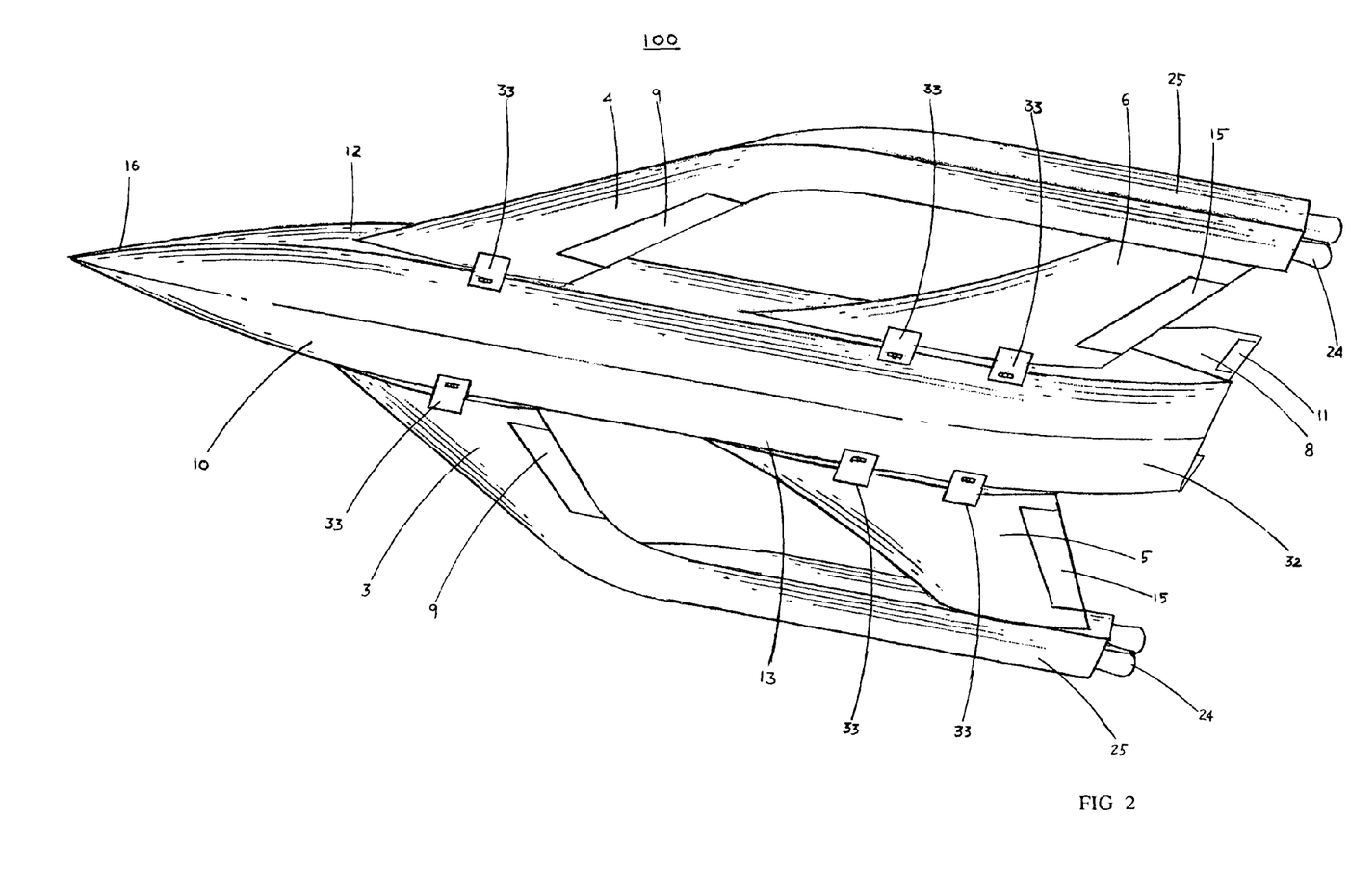
FIG. 2, is a perspective bottom view of the spacecraft of FIG. 1.
Figure 3:
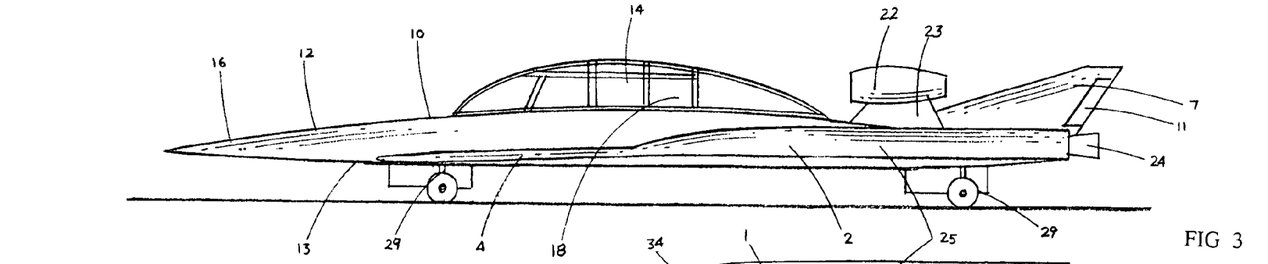
FIG. 3, is a side plan view of the spacecraft of FIG. 1.
Figure 4:
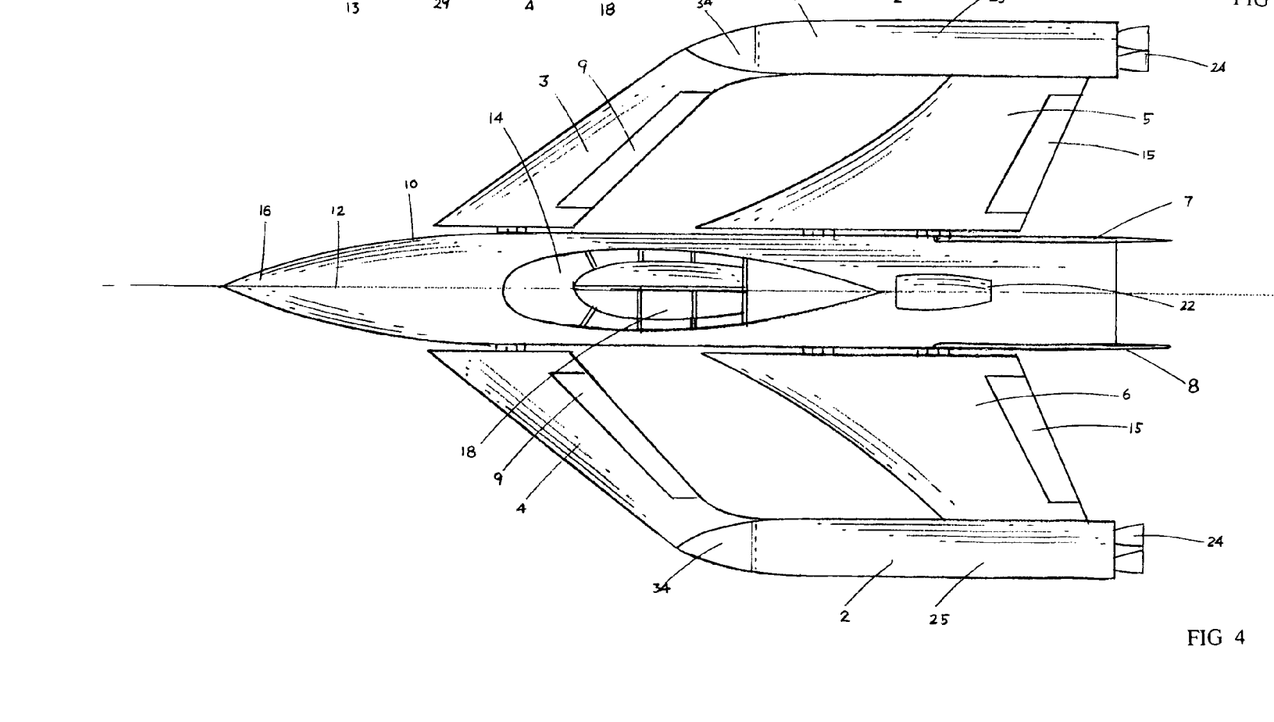
FIG. 4, is a top plan view of the spacecraft of FIG. 1.

Each of the two front wings 3, 4, comprises an elevator 9, each of two rear wings 5, 6, comprises an elevator 15, as shown in FIG. 1, 2, 8, Each of the two front wings 3, 4, and each of two rear wings 5, 6, may have a cross-sectional shape of lamina flow as shown in FIG. 3. which provide maximum load and super-maneuverable spacecrafts.

The air foil shape is provide with the wings 3, 4, 5, 6, the ratio of the lifting force of the arch-Wings maybe predetermined optimize the flight.

Figure 11:
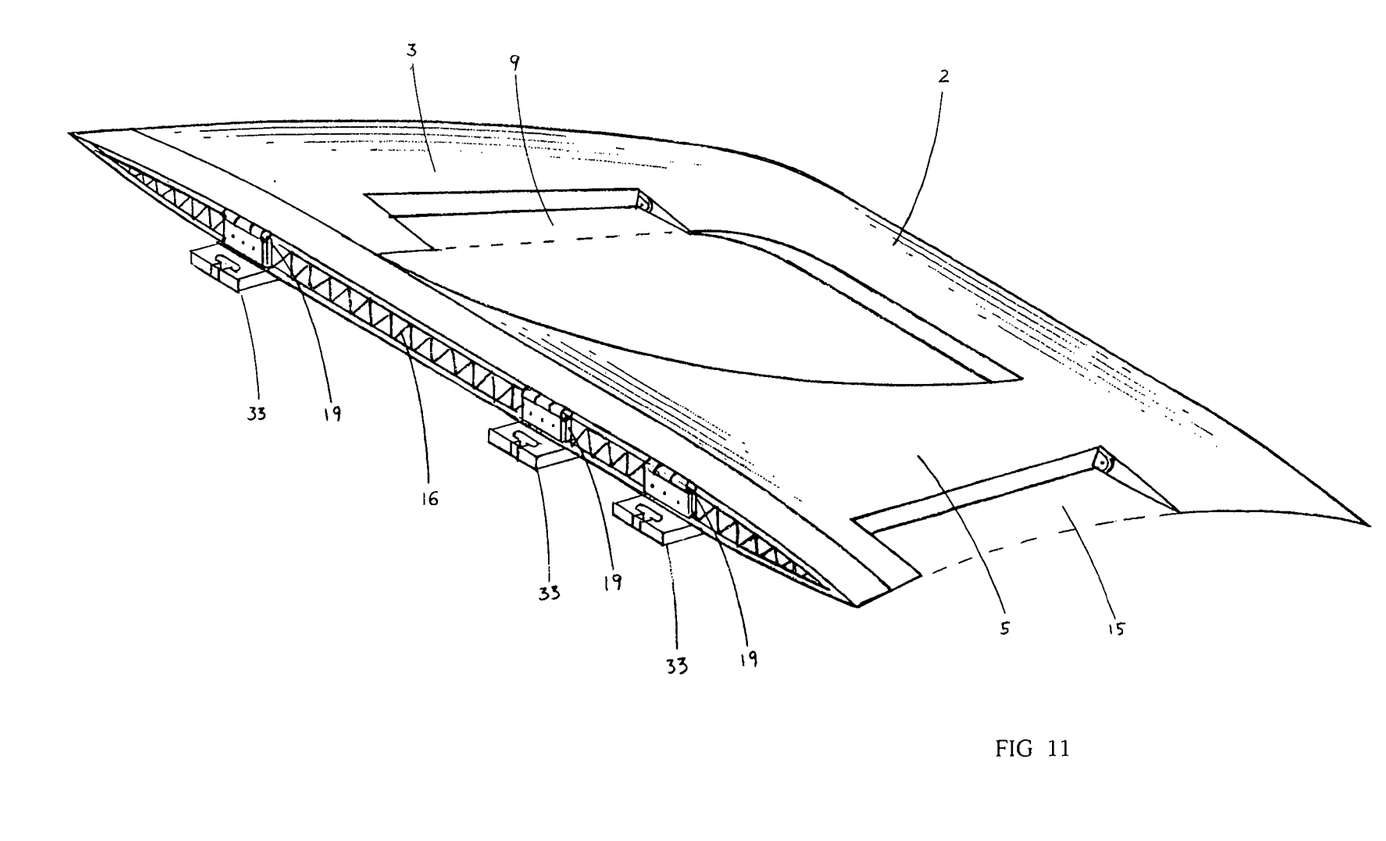
FIG. 11 is a perspective top view of Arch-Wings of the spacecraft of FIG. 1.
Figure 12:
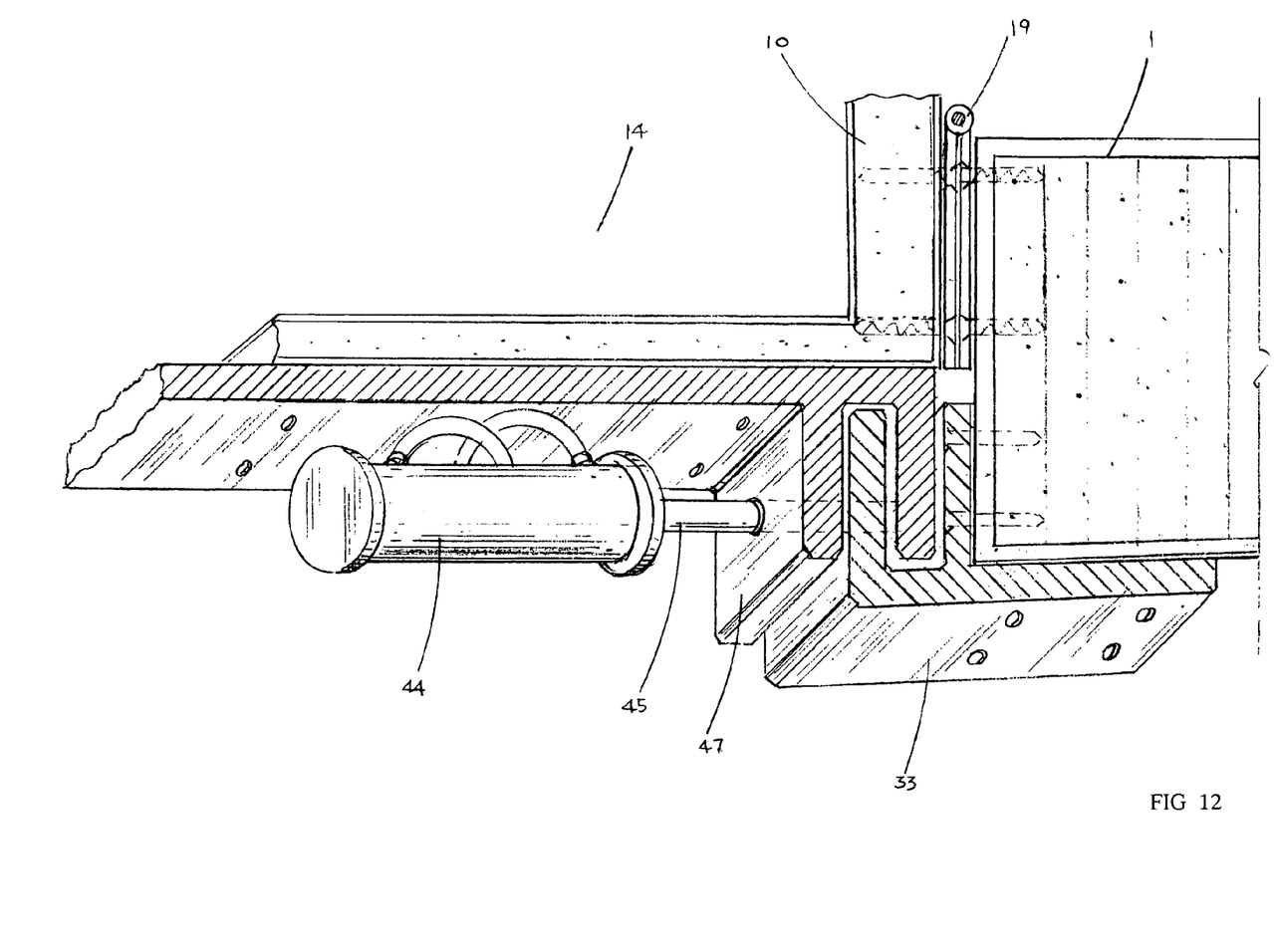
FIG. 12 is a perspective under side actuator mechanism of the spacecraft of FIG. 10.

Each of the two Arch-Wings 3, 4, 5, 6, may comprises plurality of geometric carbon wire/ceramic layer compound 36, molded structure which sear strong and highly flexible maneuverable in the air space as shown in FIG. 9, 10, 11.

Each of the fuselage wall, floor, roof and cabins may comprise plurality of multi-geometric form of carbon wire integrated into between two ceramic fabric layer 36, with fire proof glue and coated ceramic compound all skin molded structure. As shown in FIG. 9, 10.

The first level 21, further comprises fuel tank storage compartment 35, at rear cabin as shown in FIG. 7, 8. which provide jet propulsion fuel.

Each of some of the two front wings 3, 4, and two rear wings 5, 6, may comprises one or more elevators 9, 10, 15.

Each of both side the two vertical winglets 7, 8, may comprises stabilizer 11 as shown in FIG. 1, 2, 4, 8, 9.

Another aspect of the invention further comprising wherein the landing gear bays under the belly of the fuselage and both side front landing gear bays 29, at front portion bottom of the fuselage and both side rear landing gear bays 28, comprises rear parallel portion of both side front and landing gear bays 28, 29, on rear fuselage which provide maximum load and safe landing capacity.

Another aspect of the invention provides the spacecraft structure for the spacecraft 100, comprises jet-power plants 22, at anchor plate 23, the top portion of the rear fuselage 32, as shown in FIG. 1, 7, 9, which for providing jet propulsion power to take off at airport to high altitude around one hundred thousand foot until take over by main rocket propulsion power transition time period and continue proceed gravitation escape Velocity also jet braking power at re-entry atmosphere to slow down extreme high speed and rock and rolling hill driving behavior make it safe to land possible which most critical technical matter to solved another aspect of the invention provide the spacecraft structure for the spacecraft 100, comprises both side rocket propulsion plants 24, at Arch-Wings rocket propulsion fuselage compartment body structure 25, as shown in FIG. 1, 2, 8, 9, 10, which provide start main rocket propulsion power from high altitude around one hundred thousands foot to take over jet propulsion power transition time period and continue to space travel. Also rocket braking power at re-entry atmosphere with together main rocket braking and re-action engine braking and jet braking power to slow down the gravitational high speed of spacecrafts protect from high thermal at skin of structure.

Another aspect of the invention provide the spacecraft 100, comprises re-action rocket propulsion power plant 26, at front and rear portion bottom of the both side main rocket propulsion compartment body structure 25, which provide vertical take off and land (VTOL) on moon base, also re-action braking power at re-entry atmosphere with together jet braking and main rocket braking power to slow down the space crafts to avoid thermal problems of edge skin as shown in FIG. 1, 4, 8, 9.

When return back to home from space which necessary to operate hinged doors 2, open and close system by pneumatic actuator 44, with cylinder piston 45, activated under pressurized or released pressure lock. And both side arch wings fold and to carry by trailer to park garage at home.

While the invention has been shown and described with reference different embodiments thereof, it will be appreciated by the skilled in the art that variations in form, detail, compositions and operations mat be made without departing from the spirit and scope of the invention as defined by the accompanying claims.

What is claimed is:

1. A spacecraft structure that comprises:
    a center fuselage that includes a passenger cabin, a jet propulsion power plant and vertical stabilizing fins;
    a right side arch-wing;
    a left side arch-wing;
    wherein each said right side and said left side arch-wings comprises:
        three foldable hinge mechanisms anchoring said left and said right arch-wings to said center fuselage;
        said right side and said left side arch-wings including a front wing portion and a rear wing portion;
        a rocket propulsion power plant compartment positioned at a distal end of each of said front and rear wing portions such that said front and rear wing portions are connected at their respective distal ends by said rocket propulsion power plant compartment;
        wherein at least three rocket propulsion power plants are positioned within said rocket propulsion power plant compartment with two rocket propulsion power plants position at a rear portion of said rocket propulsion power plant compartment and one rocket propulsion power plant positioned at a front portion of said rocket propulsion power plant compartment;
        wherein said front wing portion is anchored at a forward portion of said center fuselage and said rear wing portion is anchored at a rear portion of said center fuselage;
        each of said front and rear wing portions comprising ailerons for pitch and roll control of said spacecraft;
    said vertical stabilizing fins comprising ailerons for yaw control of said spacecraft; and,
    a floatation device positioned directly beneath each of said rocket propulsion power plant compartments on an underside of each of said right side and said left side arch-wings.

2. The spacecraft structure of claim 1, wherein each of said hinge mechanism comprises a corresponding locking mechanism that includes a pneumatic actuator system to facilitate the pivoting and locking of said right side and said left side arch-wings.

3. The spacecraft structure of claim 2, wherein said hinge mechanisms will cause the arch-wing to pivot to a vertical while in a stowed position.

4. The spacecraft structure of claim 1, wherein said fuselage and said right side and said left side arch-wing comprise a carbon wire integrated between two ceramic fabric layers.

5. The spacecraft structure of claim 1, wherein a pivotal door is positioned at the front portion of each of said rocket propulsion power plant compartments.

6. The spacecraft structure of claim 5, wherein said pivotal doors are aerodynamically shaped so as to follow the contours of the arch-wings when said pivotal doors are in a closed position.

7. The spacecraft structure of claim 1, wherein said spacecraft is air tight and water tight.

8. The spacecraft structure of claim 1, wherein the jet propulsion power plant provides sufficient thrust to facilitate a substantially horizontal take-off from an airport.

9. The spacecraft structure of claim 1, wherein said rocket propulsion power plant positioned at said front of the rocket propulsion power plant compartment facilitates the slow-down or braking of the spacecraft.

10. The spacecraft structure of claim 1, wherein said passenger cabin includes a plurality of passenger seats and a pivotal door that allows said door to pivot vertically thereby facilitating passenger boarding and off-loading.

* * * * *